(12) United States Patent
  Chien

(10) Patent No.: US 8,545,112 B2
(45) Date of Patent: Oct. 1, 2013

(54) MAIN HOUSING FOR OPTICAL SUB-ASSEMBLY FOR TRANSCEIVERS

(75) Inventor: Chih-Cheng Chien, Taipei (TW)

(73) Assignee: Ezconn Corporation, Taipei (TW)

( * ) Notice: Subject to any disclaimer, the term of this patent is extended or adjusted under 35 U.S.C. 154(b) by 239 days.

(21) Appl. No.: 13/232,064

(22) Filed: Sep. 14, 2011

(65) Prior Publication Data

US 2013/0064519 A1   Mar. 14, 2013

(51) Int. Cl.
  *G02B 6/36* (2006.01)

(52) U.S. Cl.
  USPC .......................................................... 385/92

(58) Field of Classification Search
  USPC .......................................................... 385/92
  See application file for complete search history.

(56) References Cited

U.S. PATENT DOCUMENTS

| 7,175,353 | B2 * | 2/2007 | Liu ................................. 385/92 |
| 2004/0141696 | A1 * | 7/2004 | Chen ................................. 385/92 |
| 2004/0218857 | A1 * | 11/2004 | Hung ............................... 385/31 |
| 2005/0157988 | A1 * | 7/2005 | Lo et al. ........................... 385/92 |
| 2005/0185899 | A1 * | 8/2005 | Lo et al. ........................... 385/92 |
| 2006/0280411 | A1 * | 12/2006 | Nishizawa et al. ............. 385/93 |

* cited by examiner

*Primary Examiner* — Sung Pak
(74) *Attorney, Agent, or Firm* — Litten Patent and Trademark Office; Min-Lee Teng

(57) ABSTRACT

A main housing for optical sub-assembly for transceivers includes a cylindrical member and a bypass member. The cylindrical member has a first end for accommodating an optical transmission unit and a second end for accommodating an optical fiber connector. A tubular member forming groove is formed on an outer circumference of the cylindrical member. A sleeve forming reference hole is formed on a tubular wall of the cylindrical member in communication with the tubular member forming groove. The bypass member has a connection tube positioned in the tubular member forming groove, a filter holder positioned in the cylindrical member and connected with the connection tube for connecting a filter on the filter holder, and a sleeve for accommodating an optical receiving unit. The sleeve outward extends along the sleeve forming reference hole and is connected with the filter holder.

3 Claims, 6 Drawing Sheets

MAIN HOUSING FOR OPTICAL SUB-ASSEMBLY FOR TRANSCEIVERS

BACKGROUND OF THE INVENTION

1. Field of the Invention

The present invention relates generally to a main housing, and more particularly to a main housing for optical sub-assembly for transceivers.

2. Description of the Related Art

In current optical communication systems, laser diodes are generally used as light sources. A packaged laser diode serves as a laser diode element. A packaged light detector serves as a light detection element. As shown in FIGS. 1 and 2, front end of a laser diode element 1a and front end of a light detection element 2a are respectively connected with two metal fixtures 3 to form a light transmission unit 1 and a light receiving unit 2. Finally, the light transmission unit 1, the light receiving unit 2 and a main housing 4 are fixed and packaged to achieve an optical sub-assembly 5 for transceivers. An optical filter 6 is disposed in the interior of the main housing 4. The upper and lower surfaces of the optical filter 6 are evaporation-coated with mediums of different permeability. The light emitted from the laser diode element 1a is refracted and coupled to an optical fiber 9a via the optic filter 6. The received light is totally reflected to the light detection element 2a through the optical filter 6.

The optical fiber 9a is coaxially arranged in an optical fiber connector 9. The optical fiber connector 9 is placed in a sleeve 11. The sleeve 11 is affixed to the main housing 4 by laser welding.

The optic filter 6 is affixed to a frame 8 of a filter holder 7 and the filter holder 7 is inserted into the main housing 4. A locating pin 10 is inserted between the main housing 4 and the filter holder 7 to locate the optical filter 6 in a fixed angular position. The received/transmitted light can be reflected or refracted by the optical filter 6 and coupled to the optical detection element 2a and the optical fiber 9a.

In general, the main housing 4 is processed with a miller. It is impossible to directly form a 45-degree holder inside the main housing 4 by means of mechanical processing. Therefore, it is necessary to affix the optical filter 6 to the frame 8 of the filter holder 7 and use the locating pin 10 to lock the filter holder 7 in a fixed position. Accordingly, the optical filter 6 is 45-degree positioned in the main housing 4 to efficiently provide optical coupling effect. Due to the factor of machining of the main housing 4, the filter holder 7 and the locating pin 10, the optical filter 6 can be hardly stably located in the true angular position. As a result, the position of the focal point of the optical filter 6 may be changed to cause loss in performance.

SUMMARY OF THE INVENTION

A primary object of the present invention is to provide a main housing for optical sub-assembly for transceivers, which is able to greatly enhance optical coupling and alignment and achieve excellent transmission performance.

A further object of the present invention is to provide the above main housing for optical sub-assembly for transceivers. The assembling process of the component of the main housing for optical sub-assembly for transceivers is simplified so that the manufacturing cost is greatly lowered.

To achieve the above and other objects, the main housing for optical sub-assembly for transceivers of the present invention includes a cylindrical member and a bypass member. The cylindrical member is made of metal material. The cylindrical member has a first end for accommodating an optical transmission unit and a second end for accommodating an optical fiber connector. The cylindrical member has a central passage extending from the first end to the second end. A tubular member forming groove is formed on an outer circumference of the cylindrical member. A sleeve forming reference hole is formed on a tubular wall of the cylindrical member in communication with the central passage. The sleeve forming reference hole also communicates with the tubular member forming groove. The bypass member is made of plastic material by means of insert injection to connect with the cylindrical member. The cylindrical member and the bypass member together form a T-shaped structure. The bypass member has a connection tube positioned in the tubular member forming groove, a filter holder positioned in the central passage of the cylindrical member and connected with the connection tube for precisely connecting the filter with the filter holder by a true angle, and a sleeve for accommodating the optical receiving unit. The sleeve outward extends along the sleeve forming reference hole and is connected with the filter holder.

The light emitted from the optical transmission unit is refracted and focused by the filter and coupled to the optical fiber in the optical fiber connector. The light received by the optical fiber is totally reflected and focused by the filter and coupled to the optical receiving unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
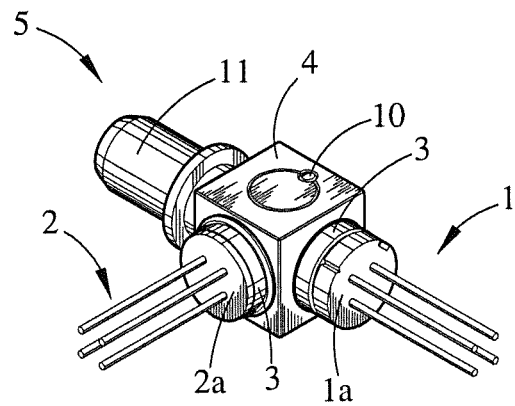
FIG. 1 is a perspective assembled view of a conventional optical sub-assembly for transceivers.
Figure 2:
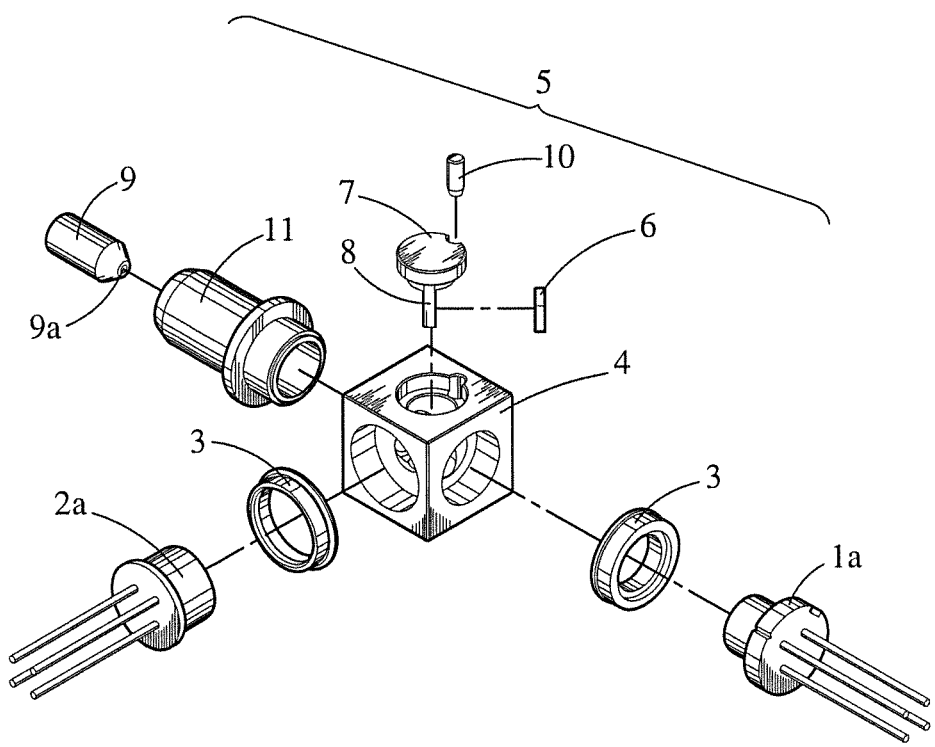
FIG. 2 is a perspective exploded view of the conventional optical sub-assembly for transceivers.
Figure 3:
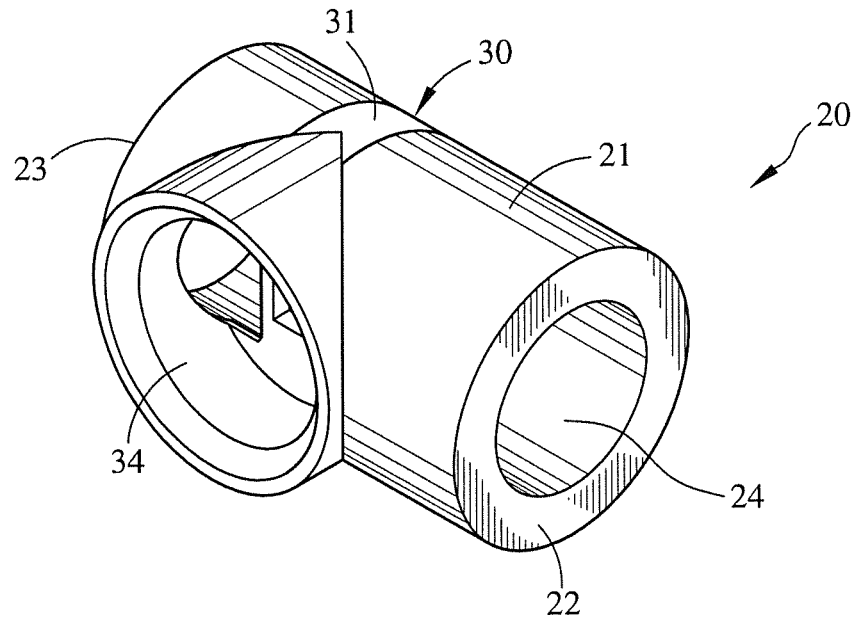
FIG. 3 is a perspective view of the main housing for optical sub-assembly for transceivers of the present invention.
Figure 4:
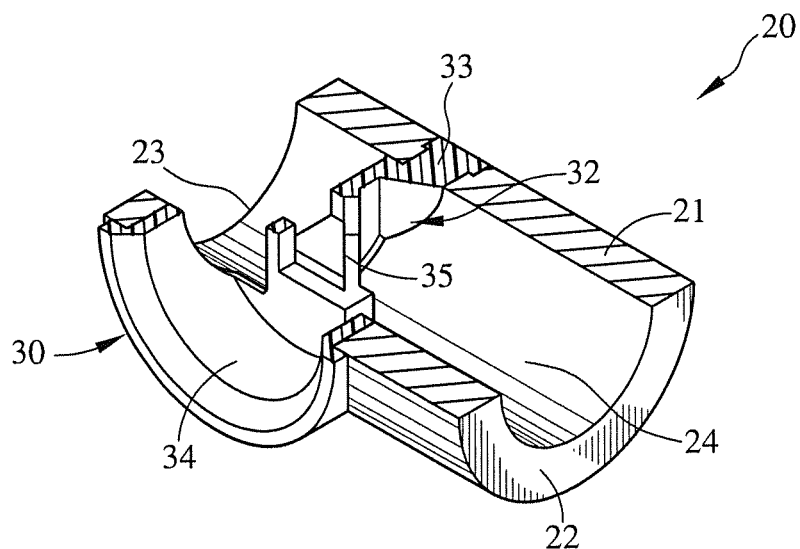
FIG. 4 is a cross-sectional view of the main housing for optical sub-assembly for transceivers of the present invention.
Figure 5:
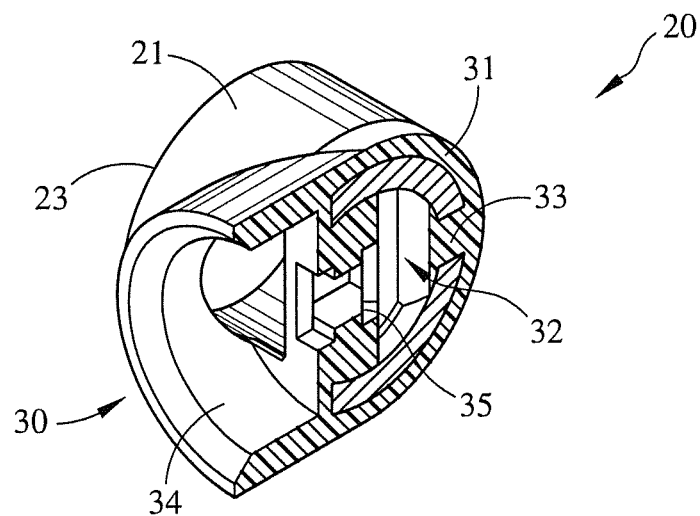
FIG. 5 is a longitudinal sectional view of the main housing for optical sub-assembly for transceivers of the present invention.

Please refer to FIGS. 3 to 5. The main housing 20 for optical sub-assembly for transceivers of the present invention includes a cylindrical member 21 made of metal material and a bypass member 30 made of plastic material by means of insert injection to connect with the cylindrical member 21. The cylindrical member 21 and the bypass member 30 together form a T-shaped structure.

Figure 6:
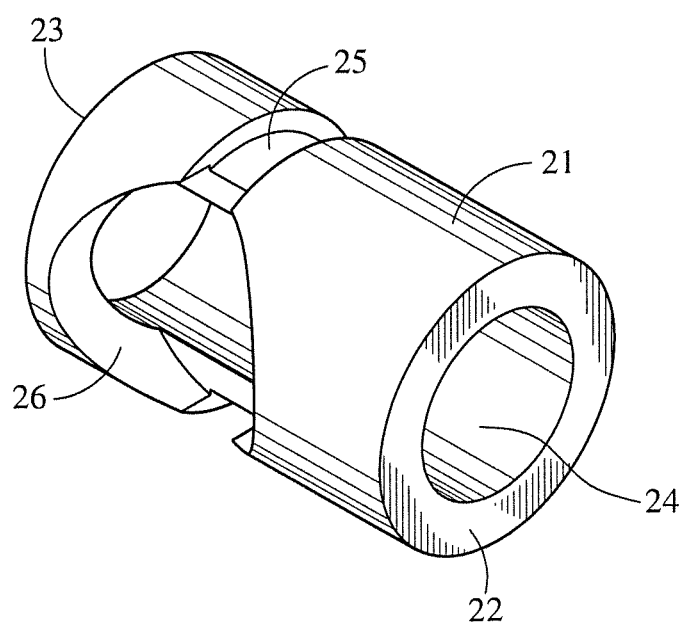
FIG. 6 is a front perspective view of the cylindrical member of the main housing for optical sub-assembly for transceivers of the present invention.
Figure 7:
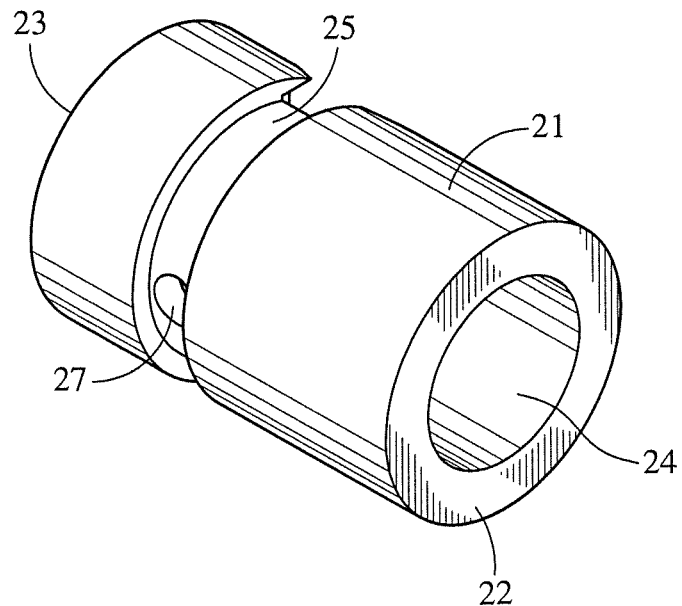
FIG. 7 is a rear perspective view of the cylindrical member of the main housing for optical sub-assembly for transceivers of the present invention.
Figure 8:
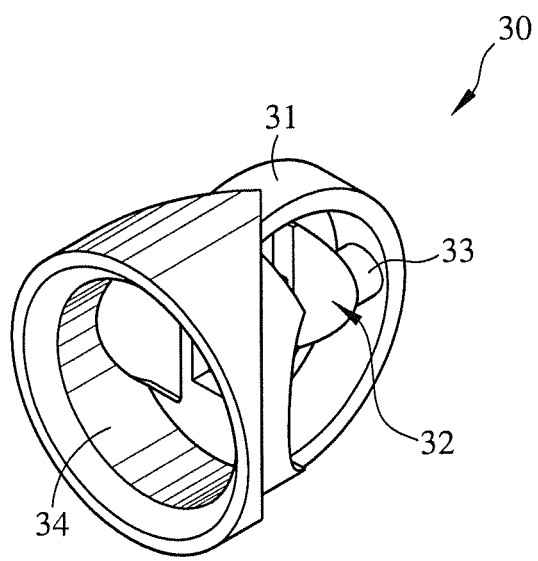
FIG. 8 is a perspective view of the bypass member of the main housing for optical sub-assembly for transceivers of the present invention.
Figure 9:
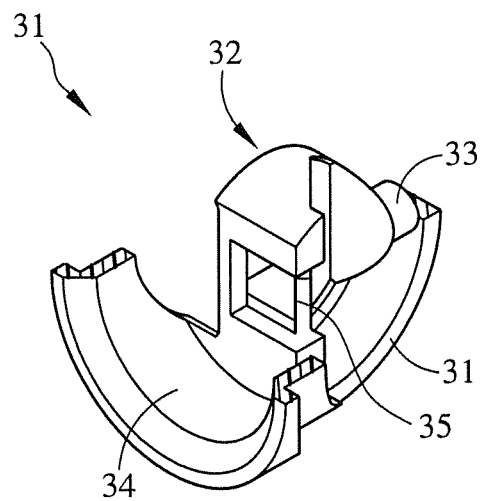
FIG. 9 is a cross-sectional perspective view of the bypass member of the main housing for optical sub-assembly for transceivers of the present invention.
Figure 10:
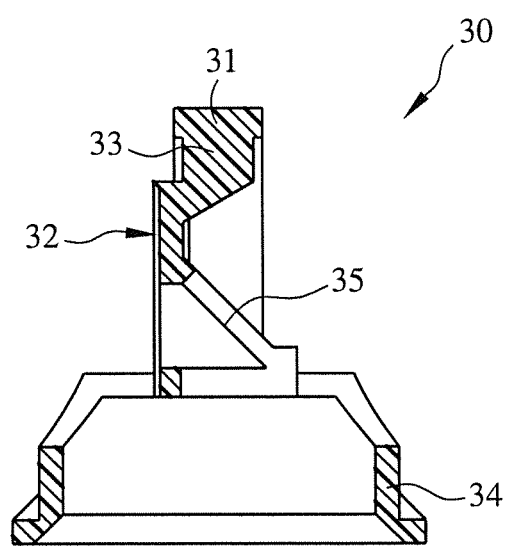
FIG. 10 is a cross-sectional view of the bypass member of the main housing for optical sub-assembly for transceivers of the present invention.
Figure 11:
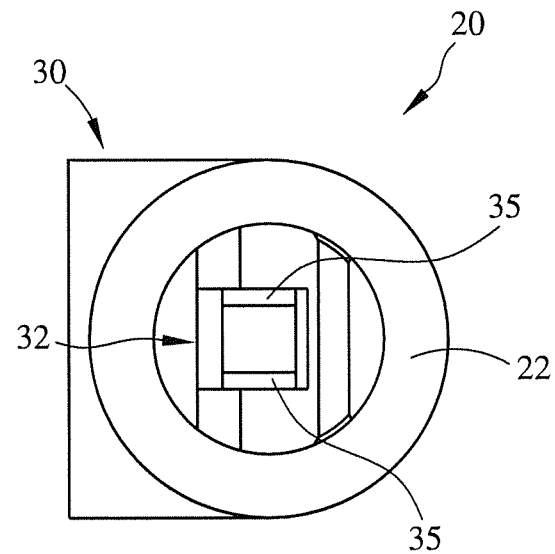
FIG. 11 is a right view of the bypass member of the main housing for optical sub-assembly for transceivers of the present invention.

Please refer to FIGS. 6 and 7. The cylindrical member 21 has a first end 22 for accommodating an optical transmission unit and a second end 23 for accommodating an optical fiber connector. The cylindrical member has a central passage 24 extending from the first end 22 to the second end 23. A tubular member forming groove 25 is formed on an outer circumference of the cylindrical member 21. In addition, a sleeve forming reference hole 26 is formed on a tubular wall of the cylindrical member 21 in communication with the central passage 24. The sleeve forming reference hole 26 communicates with the tubular member forming groove 25 to form a flow way. A material filling hole 27 is formed on the tubular member forming groove 25 for plastic material to flow into the central passage 24.

Please refer to FIGS. 8, 9, 10 and 11. The bypass member 30 has a connection tube 31 positioned in the tubular member forming groove 25, a filter holder 32 positioned in the central passage 24 of the cylindrical member 21, a connection section 33 positioned in the material filling hole 27, and a sleeve 34 for accommodating an optical receiving unit. The connection tube 31 is connected with the filter holder 32 via the connection section 33. The sleeve 34 outward extends along the sleeve forming reference hole 26 and is connected with the filter holder 32.

The filter holder 32 has a filter rest section 35 formed on the filter holder 32 by an angle of 45 degrees. The filter rest section 35, the filter holder 32 and the connection tube 31 are integrally formed so that the filter rest section 35 is very precisely positioned in an inclined position.

Figure 12:
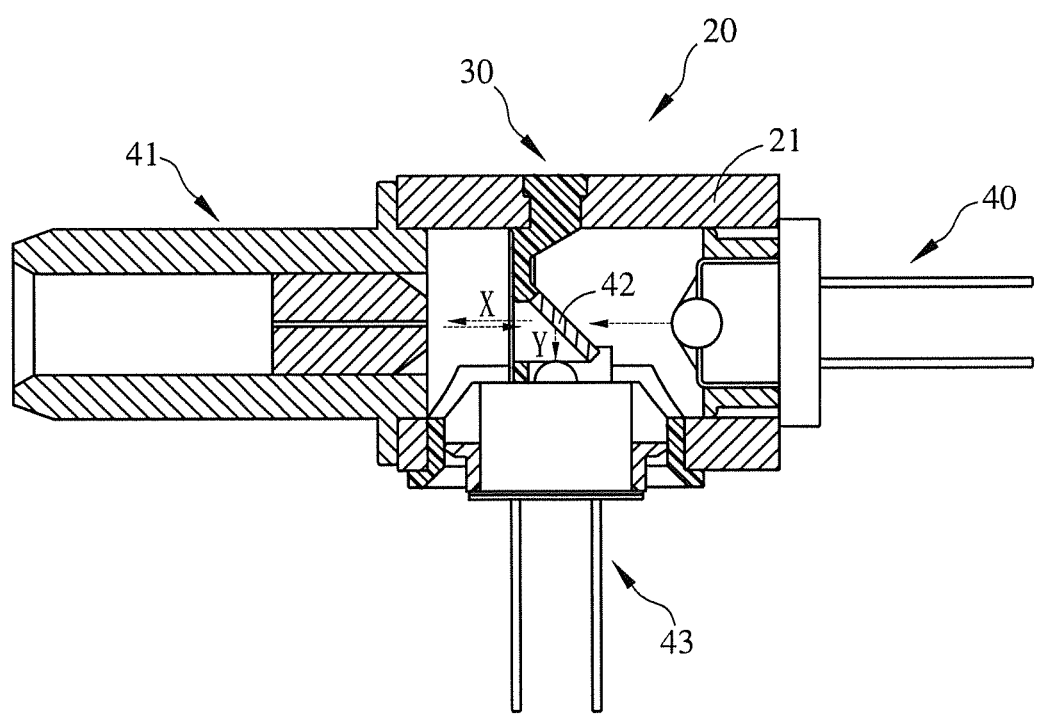
FIG. 12 is a sectional view of the main housing for optical sub-assembly for transceivers of the present invention, showing that the main housing is connected with an optical element.

Referring to FIG. 12, an optical element is rested on the main housing 20. The first end 22 of the cylindrical member 21 is connected with the optical transmission unit 40. The second end 23 of the cylindrical member 21 is connected with the optical fiber connector 41. A filter 42 is affixed to the filter holder 32. The sleeve 34 of the bypass member 30 is connected with the optical receiving unit 43 to complete the assembly.

The upper and lower surfaces of the filter 42 are evaporation-coated with mediums of different permeability. Accordingly, the light emitted from the laser diode element of the optical transmission unit 40 (in the direction of arrow X) is refracted and focused by the filter 42 and coupled to the optical fiber in the optical fiber connector 41. The light received by the optical fiber (in the direction of arrow Y) is totally reflected and focused by the filter 42 and coupled to a light detection element in the optical receiving unit 43.

In conclusion, the bypass member 30 is made of plastic material by means of insert injection to integrally connect with the cylindrical member 21. Accordingly, the component assembling process is simplified and the problem of secondary processing is overcome. Therefore, the manufacturing cost is greatly lowered. In addition, the filter rest section 35, the filter holder 32 and the bypass member 30 are integrally formed so that the filter 42 is precisely located on the filter rest section 35 without changing its focusing/coupling position due to any factor of machining. In this case, the optical coupling and alignment can be enhanced.

The above embodiment is only used to illustrate the present invention, not intended to limit the scope thereof. It is understood that many changes or modifications of the above embodiment can be made by those who are skilled in this field without departing from the spirit of the present invention. The scope of the present invention is limited only by the appended claims.

What is claimed is:

1. A main housing for optical sub-assembly for transceivers for connecting with an optical fiber connector, an optical transmission unit, an optical receiving unit and a filter, the light emitted from the optical transmission unit being refracted and focused by the filter and coupled to optical fiber in the optical fiber connector, the light received by the optical fiber being totally reflected and focused by the filter and coupled to the optical receiving unit, the main housing comprising:

a cylindrical member made of metal material, the cylindrical member having a first end for accommodating the optical transmission unit and a second end for accommodating the optical fiber connector, the cylindrical member having a central passage extending from the first end to the second end, a tubular member forming groove being formed on an outer circumference of the cylindrical member, a sleeve forming reference hole being formed on a tubular wall of the cylindrical member in communication with the central passage, the sleeve forming reference hole communicating with the tubular member forming groove to form a flow way; and a bypass member made of plastic material by means of insert injection to connect with the cylindrical member, the cylindrical member and the bypass member together forming a T-shaped structure, the bypass member having a connection tube positioned in the tubular member forming groove, a filter holder positioned in the central passage of the cylindrical member and connected with the connection tube for precisely connecting the filter with the filter holder, and a sleeve for accommodating the optical receiving unit, the sleeve outward extending along the sleeve forming reference hole and being connected with the filter holder.

2. The main housing for optical sub-assembly for transceivers as claimed in claim 1, wherein the filter holder has a filter rest section formed on the filter holder by an angle of 45 degrees.

3. The main housing for optical sub-assembly for transceivers as claimed in claim 1, wherein a material filling hole is formed on the tubular member forming groove of the cylindrical member for forming a connection section, the connection tube being connected with the filter holder via the connection section.

* * * * *